(12) United States Patent
Derzon et al.

(10) Patent No.: US 9,170,340 B1
(45) Date of Patent: Oct. 27, 2015

(54) COMPACT ION CHAMBER BASED NEUTRON DETECTOR

(71) Applicant: Sandia Corporation, Albuquerque, NM (US)

(72) Inventors: Mark S. Derzon, Albuquerque, NM (US); Paul C. Galambos, Albuquerque, NM (US); Ronald F. Renzi, Tracy, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/539,972

(22) Filed: Nov. 12, 2014

Related U.S. Application Data (60) Division of application No. 13/559,370, filed on Jul. 26, 2012, now Pat. No. 8,912,502, which is a continuation-in-part of application No. 12/046,041, filed on Mar. 11, 2008, now abandoned.

(60) Provisional application No. 60/894,700, filed on Mar. 14, 2007.

(51) Int. Cl.
*G01T 3/00* (2006.01)
*H01J 47/02* (2006.01)

(52) U.S. Cl.
CPC ........ *G01T 3/008* (2013.01); *H01J 47/02* (2013.01)

(58) Field of Classification Search
CPC .................................. G01T 3/00; G01T 3/008
USPC ........................................... 250/385.1, 391
See application file for complete search history.

(56) References Cited

U.S. PATENT DOCUMENTS

| 4,795,910 A | 1/1989 | Henderson et al. |
| 7,157,719 B2* | 1/2007 | Martoff .................... 250/390.02 |
| 2003/0213917 A1 | 11/2003 | Menlove et al. |
| 2005/0220246 A1 | 10/2005 | Masterov et al. |
| 2007/0018110 A1 | 1/2007 | McGregor et al. |

OTHER PUBLICATIONS

Crane and Baker, "Neutron Detectors in Passive Nondestructive Assay of Nuclear Materials", ed. By D. Reilly, et al., Nuclear Regulatory Commission NUREG/CR-5550, Mar. 1991, pp. 379-404.
Martin et al., "Simulation of high-pressure micro-capillary 3He counters", J Phys. G: Nucl. Part. Phys 35 (2008) 115193 (14 pp.).

* cited by examiner

*Primary Examiner* — Mark R Gaworecki
*Assistant Examiner* — Kenneth J Malkowski
(74) *Attorney, Agent, or Firm* — Martin I. Finston (57) ABSTRACT

A directional neutron detector has an ion chamber formed in a dielectric material; a signal electrode and a ground electrode formed in the ion chamber; a neutron absorbing material filling the ion chamber; readout circuitry which is electrically coupled to the signal and ground electrodes; and a signal processor electrically coupled to the readout circuitry. The ion chamber has a pair of substantially planar electrode surfaces. The chamber pressure of the neutron absorbing material is selected such that the reaction particle ion trail length for neutrons absorbed by the neutron absorbing material is equal to or less than the distance between the electrode surfaces. The signal processor is adapted to determine a path angle for each absorbed neutron based on the rise time of the corresponding pulse in a time-varying detector signal.

9 Claims, 8 Drawing Sheets

COMPACT ION CHAMBER BASED NEUTRON DETECTOR

CROSS-REFERENCE TO RELATED APPLICATIONS

This application is a Divisional of application Ser. No. 13/559,370 filed on Jul. 26, 2012, entitled, "ION CHAMBER BASED NEUTRON DETECTORS" which is a Continuation-in-Part application of application Ser. No. 12/046,041 filed on Mar. 11, 2008, entitled "GAS-FILLED MICRO-CHANNEL ARRAY NEUTRON DETECTOR" and claims the priority benefit of Provisional Application No. 60/894,700, filed Mar. 14, 2007 and entitled "3D ELECTRONIC RADIATION TRACKING SENSOR." The disclosures of these applications are incorporated herein by reference.

GOVERNMENT CONTRACT REFERENCE

This invention was developed under Contract DE-AC04-94AL85000 between Sandia Corporation and the U.S. Department of Energy. The U.S. Government has certain rights in this invention.

TECHNICAL FIELD

The present invention is directed generally to neutron detectors, and, more particularly, to neutron detectors based on ion chambers.

BACKGROUND OF THE INVENTION

There are two underlying issue that motivated the disclosed inventions. The first was to improve capabilities for finding special nuclear materials (SNM). The second was to develop potential approaches to improve the capabilities for characterizing or assessing SNM. To get the most information from a radiation field for both of those goals, the ideal sensor would need to discriminate against all forms of background as well as measure energy spectra and image the location of the radiation. The present invention represents an attempt to develop this ideal sensor system and to meet these goals concurrently.

Cost is an issue however the need is great enough and value acceptable. The cost of this type of unique development is likely to be much less than that which has already gone into helium-3 replacement technologies to date and is currently is being spent on scintillator improvements. The technology also offers functionality not provided by current alternatives.

Current neutron detection technology is primarily focused on bulk thermal neutron detectors such as commercial helium-3 tubes or fast neutron detection utilizing liquid or plastic scintillators. Helium-3 detectors are less desirable because of the limited supply of helium-3. Additionally, current helium-3 detectors are bulky and, aside from gaseous electron multipliers (GEMs), the helium-3 proportional tubes do not routinely generate two dimensional information. Multiwire helium-3 proportional detectors have been investigated, but these use a lot of the helium-3 gas and can be difficult to field.

Liquid scintillators have disadvantages in that they are gamma sensitive, the liquids are often flammable and they require bulky photomultiplier tubes. They can discriminate between neutrons and gammas at up to 10 MHz in a laboratory environment, but in intense short-pulsed situations, such as that encountered in active detection, pulse shape discrimination may not be fast enough to acquire the data and resolve gamma background from neutron signals. Liquid scintillators (many of which do not provide pulse shape discrimination against gammas) can be made pixelated, but offer no capability for spectral or angular discrimination without the need for a heavy shield or aperture system.

Exemplary embodiments of the present invention may improve gamma rejection and reduce the consumption of helium-3, as well as providing for increased resolution and directional discrimination. These and other advantages of the present invention may be understood by those skilled in the art from the following detailed description.

SUMMARY OF THE INVENTION

An exemplary embodiment of the present invention is a thermal neutron detector, including: a high pressure ion chamber formed in a dielectric material; first and second electrodes formed in the high pressure ion chamber; a neutron absorbing material filling the ion chamber; and a neutron moderating material surrounding at least a portion of the high pressure ion chamber. The high pressure ion chamber has a substantially planar first surface on which the first electrode is formed and a substantially planar second surface, parallel to the first surface, on which the second electrode is formed. The chamber pressure of the neutron absorbing material is equal to or greater than 100 atm.

Another exemplary embodiment of the present invention is a neutron detector with monolithically integrated readout circuitry, including: a bonded semiconductor die; an ion chamber formed in the bonded semiconductor die; a first electrode and a second electrode formed in the ion chamber; a neutron absorbing material filling the ion chamber; and the readout circuitry which is electrically coupled to the first and second electrodes. The bonded semiconductor die includes an etched semiconductor substrate bonded to an active semiconductor substrate. The readout circuitry is formed in a portion of the active semiconductor substrate. The ion chamber has a substantially planar first surface on which the first electrode is formed and a substantially planar second surface, parallel to the first surface, on which the second electrode is formed.

A further exemplary embodiment of the present invention is a directional neutron detector, including: an ion chamber formed in a dielectric material; a signal electrode and a ground electrode formed in the ion chamber; a neutron absorbing material filling the ion chamber; readout circuitry which is electrically coupled to the signal and ground electrodes; and a signal processor electrically coupled to the readout circuitry. The ion chamber has a substantially planar first surface on which the signal electrode is formed and a substantially planar second surface, parallel to the first surface, on which the ground electrode is formed. The second surface is located a predetermined distance from the first surface along the normal to the first surface. The chamber pressure of the neutron absorbing material is selected such that the reaction particle ion trail length for neutrons absorbed by the neutron absorbing material is equal to or less than the predetermined distance between the first surface and the second surface of the ion chamber. The readout circuitry is adapted to generate a time varying signal proportional to the charge collected by the signal electrode as a function of time. The collected charge originates from absorption of neutrons by the neutron absorbing material, and the time varying signal includes a pulse corresponding to each absorbed neutron. The signal processor is adapted to determine a path angle relative to the normal to the first surface of the ion chamber for each absorbed neutron based on the rise time of the corresponding pulse in the time varying signal.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Exemplary embodiments of the present invention include a number of designs for ion chamber based neutron detectors that may be used for thermal and/or fast neutron detection. These exemplary ion chamber based neutron detectors may include monolithically integrated readout circuitry. Additionally, these exemplary ion chamber neutron detectors may be designed to detect the direction of flight of detected neutrons, thereby allowing for faster and simpler localization and identification of the neutron source.

Figure 1:
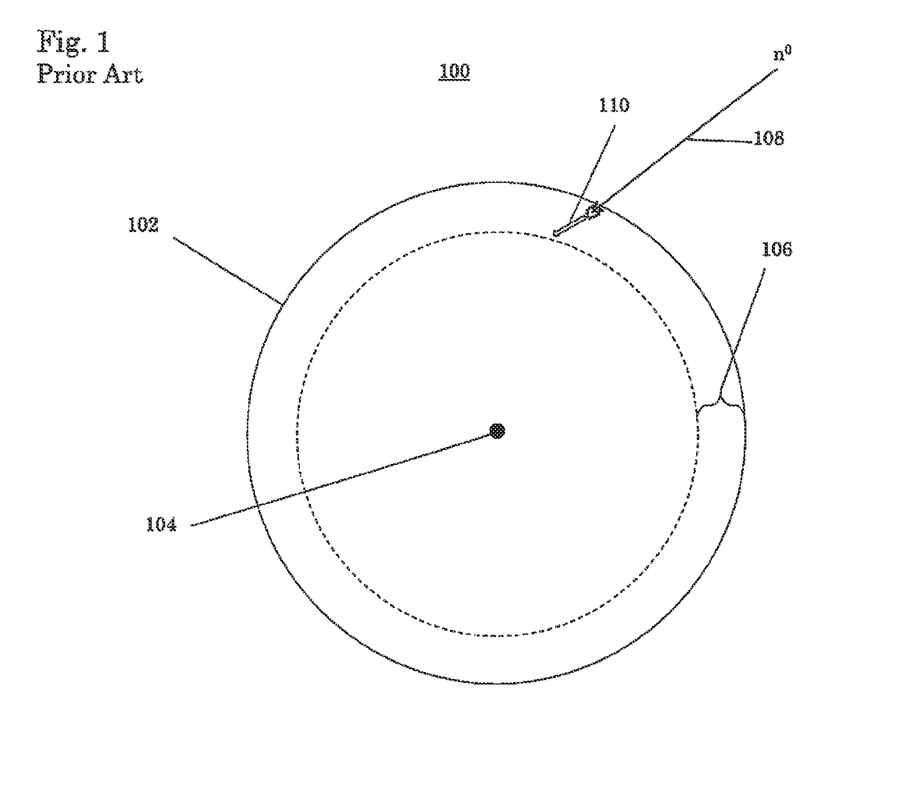
FIG. 1 is a side cut-away drawing of prior art proportional tube neutron detector.

FIG. 1 illustrates a cutaway drawing of prior art proportion tube neutron detector 100. Prior art proportion tube neutron detector 100 includes tube 102 and wire 104. The tube is filled with a gas (often helium-3, helium-3) selected to absorb neutrons and create an ion path. FIG. 1 also illustrates an exemplary detection event in which a neutron traveling along path 108 is absorbed by the gas filling tube 102 and creating reaction particle ion trail 110. An electrical potential between the wall of tube 102 and wire 104 separates charge from reaction particle ion trail 110. This separated charge is then collected to detect the detection event.

There is considerable room for improvement in system efficiency as well as in making more efficient use of helium-3 gas in a neutron detector of this type. Prior art cylindrical proportional tube neutron detection systems, such as prior art proportion tube neutron detector 100, typically have relatively poor utilization of the helium-3 for thermal neutron detection. This utilization may be somewhat higher for fast neutron, but is often still less than desirable. The low utilization rate arises in part because of the cylindrical geometry of the proportional tubes. Neutrons do not penetrate to the center of the tubes and therefore do not uniformly sample the gas in the system. The effect of moderating materials used in thermal neutron detectors is non-uniform as well. A preferable system would have helium-3 uniformly dispersed across the face of a detector and be uniformly moderated.

Experiments, using a slab geometry at three different pressures, which have conducted by the inventors show that the attenuation of neutrons in helium-3 gas is a function of depth and pressures. One notable result of these experiments is that for a 10 atm pressure, the attenuation of thermal neutrons (0.025 eV) is about 50% at 5 mm. However, the tube diameter of a typical prior art proportion tube neutron detector is on the order of 2.cm. This means that most of the thermal neutrons do not penetrate to the core of the tube and those atoms away from the edge of the tube do not see the neutron flux. In other words, because the gas self-shields and removes neutrons, the gas inside the tube does not sample the neutron flux as effectively as the gas at the edge. Because of this self-shielding, the most effective use of the helium-3 atoms along neutron path 108 occurs in uniform sheet 106. Another key implication is that as the total absorption (intrinsic efficiency) increases, the efficiency per atom decreases. This is because there are fewer neutrons to interact with each additional helium-3 atom. Together, these features imply that outer uniform sheet 106 of neutron absorber (often helium-3) in prior art proportion tube neutron detector 100 shield, or self-shield, the core neutron absorber from the neutrons one wishes to detect. This effect may be more pronounced for thermal neutrons than for fast neutron, which may penetrate further into the neutron absorber, thus increasing the width of uniform sheet 106.

Figure 2A:
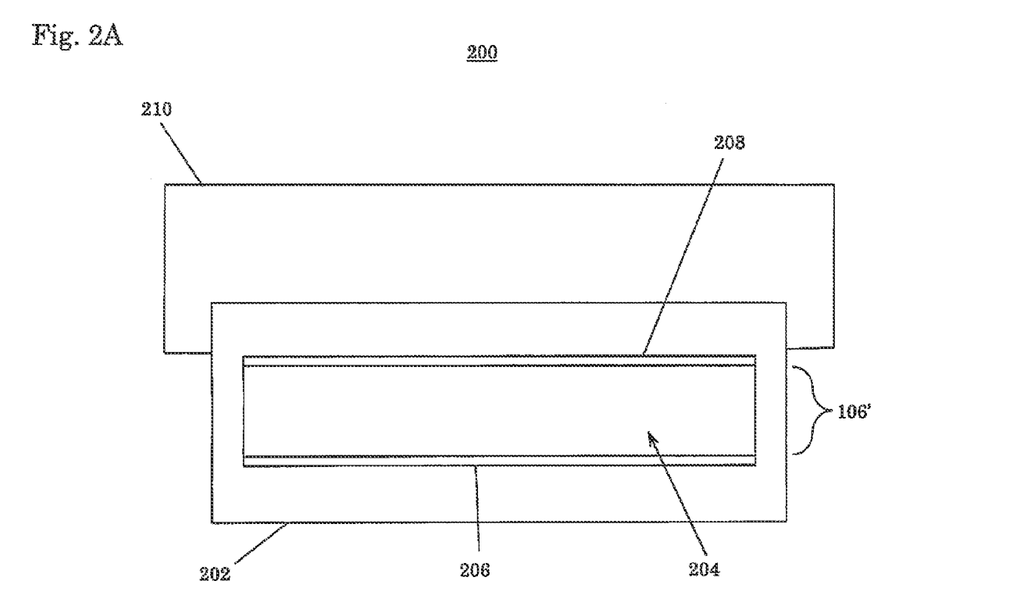
FIG. 2A is a side cut-away drawing of an exemplary ion chamber based thermal neutron detector according to the present invention.
Figure 2B:
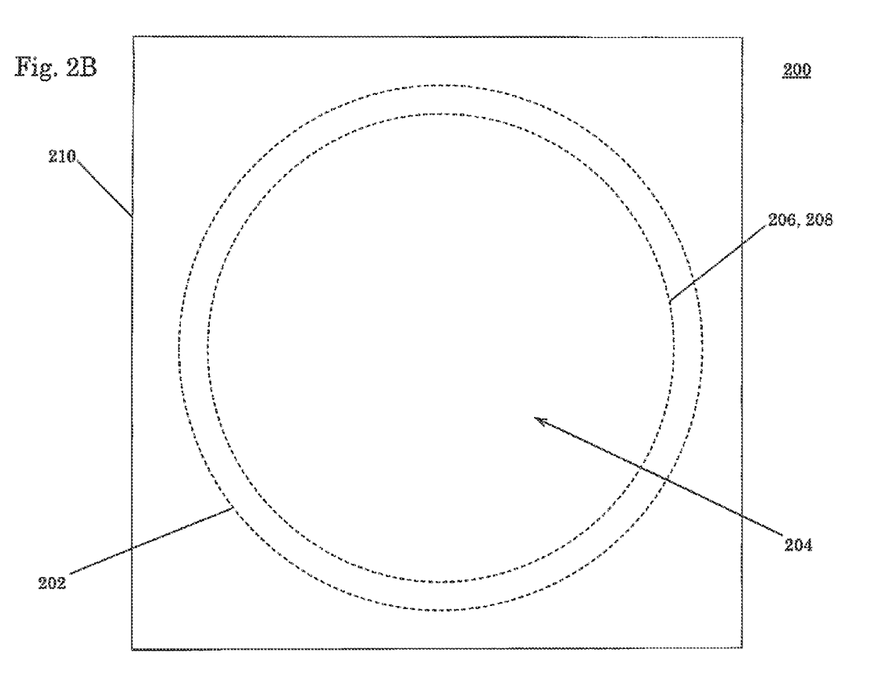
FIG. 2B is a top plan drawing of the exemplary ion chamber based thermal neutron detector of FIG. 2A.

FIGS. 2A and 2B illustrate exemplary ion chamber based thermal neutron detector 200 according to the present invention. Exemplary ion chamber based thermal neutron detector 200 includes: high pressure ion chamber 202, which is filled with neutron absorbing material 204; bottom electrode 206 formed on the bottom surface of high pressure ion chamber 202; top electrode 208 formed on the top surface of the high pressure ion chamber 202; and neutron moderating material 210, which surround at least a portion of high pressure ion chamber 202. Reference herein to the top and bottom sides of exemplary ion chamber based thermal neutron detector 200 are used as illustrated in the side cut away drawing of FIG. 2A. These references are merely for clarity and are not intended to be limiting.

It is noted that although neutron moderating material 210 is illustrated in FIG. 2A as surrounding only the top portion of high pressure ion chamber 202, in other exemplary embodiments it may surround both the top and bottom portions of high pressure ion chamber 202, or high pressure ion chamber 202 may be completely surrounded by neutron moderating material 210. Neutron moderating material 210 may be any material known to moderate neutrons, one example being polyethylene.

High pressure ion chamber 202 is desirably formed of a dielectric material, such as silicon or FR4 glass laminate. This allows high pressure ion chamber 202 to be filled with neutron absorbing material 204 at pressures in excess of 100 atm, possibly exceeding 10,000 atm. At the highest chamber pressures, neutron absorbing material 204 may even become liquefied. (For particular thin high pressure ion chambers 202, surface or capillary effects may play a role in liquefaction of neutron absorbing material 204.)

The bottom and top surfaces of high pressure ion chamber 202 (on which bottom electrode 206 and top electrode 208 are formed, respectively) are desirably substantially planar and parallel to one another. Bottom electrode 206 and top electrode 208 may formed by depositing a metal or other conductor on these surfaces; or in the case in which high pressure ion chamber 202 is formed from silicon (or another material with semiconducting properties), bottom electrode 206 and top electrode 208 may be formed by doping these surfaces to provide sufficient conductivity.

Neutron absorbing material 204 may be one of a number of materials such as: helium-3; helium-4; xenon; hydrogen; propane; or methane; however, a combination of helium-3 and xenon may be preferable. One issue with this choice of material is the limited supply of helium-3. Therefore, more efficient use of neutron absorbing material 204 is very desirable. As discussed above, thermal neutron flux is rapidly attenuated in helium-3 even at a modest pressure of 10 atm. This attenuation is even more rapid at higher pressures. Thus, to improve the efficiency, per atom, of neutron absorbing material 204, distance 106' between bottom electrode 206 and top electrode 208 is desirably equal to or less than the 50% attenuation length for thermal neutrons in neutron absorbing material 204 at the chamber pressure. One can think of this as the process of unrolling the outer uniform sheet 106 of tube 102, where most of the thermal neutron interactions occurred in prior art proportion tube neutron detector 100. The area of the cross-section of high pressure ion chamber 202 parallel to electrodes 206, 208 is desirably greater than or equal to 100 times distance 106 squared. This significant increases the efficiency of the volume of neutron absorbing material 204.

Another advantage of reducing distance 106 between electrodes 206, 208 is that is reduces recombination of charge before it can be collected at electrodes 206, 208 by reducing the drift time before collection for these charges. This reduction in charge drift time may increase sensitivity of ion chamber based thermal neutron detector 200, allowing for improved energy resolution, as well as improving resolution for the rise time of the pulse resulting from a detection event. As described below with reference to FIG. 4, improved pulse rise time resolution may be desirable for determining the angle of the neutron path relative to the normal of the top and bottom surfaces of ion chamber based thermal neutron detector 200.

Figure 3A:
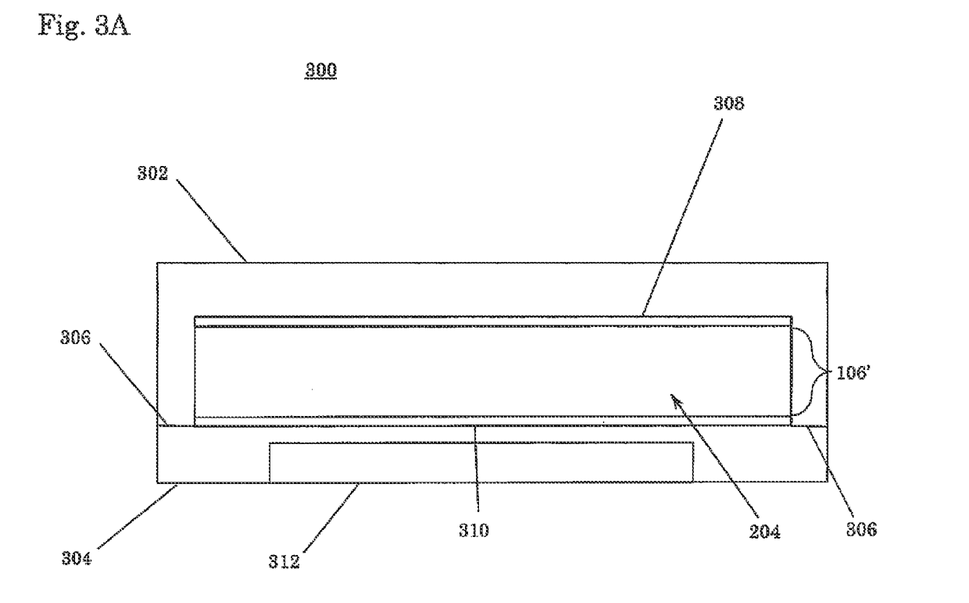
FIG. 3A is a side cut-away drawing of an exemplary ion chamber based neutron detector with monolithically integrated readout circuitry according to the present invention.
Figure 3B:
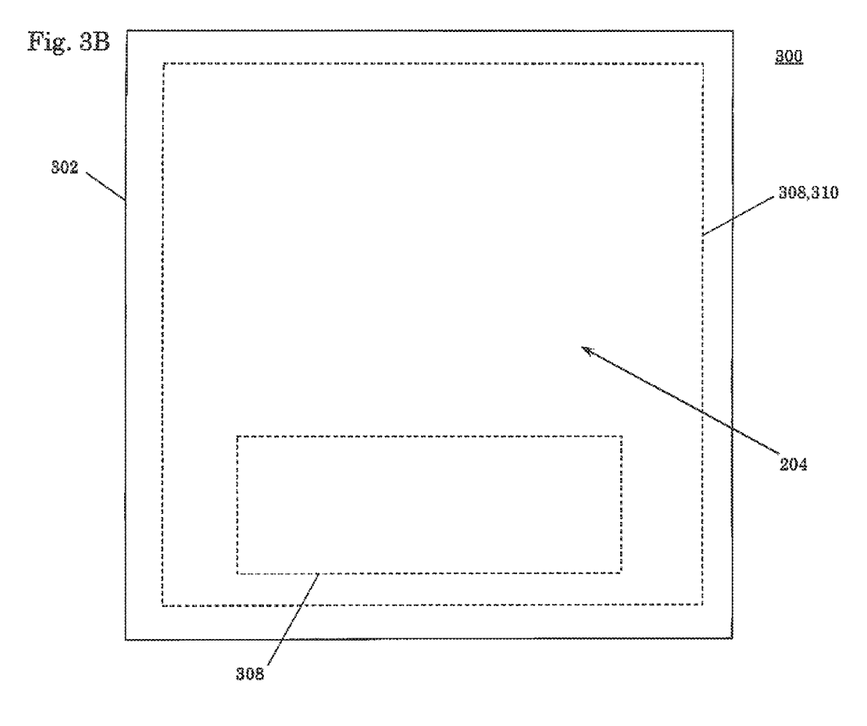
FIG. 3B is a top plan drawing of the exemplary ion chamber based neutron detector of FIG. 3A.
Figure 5A:
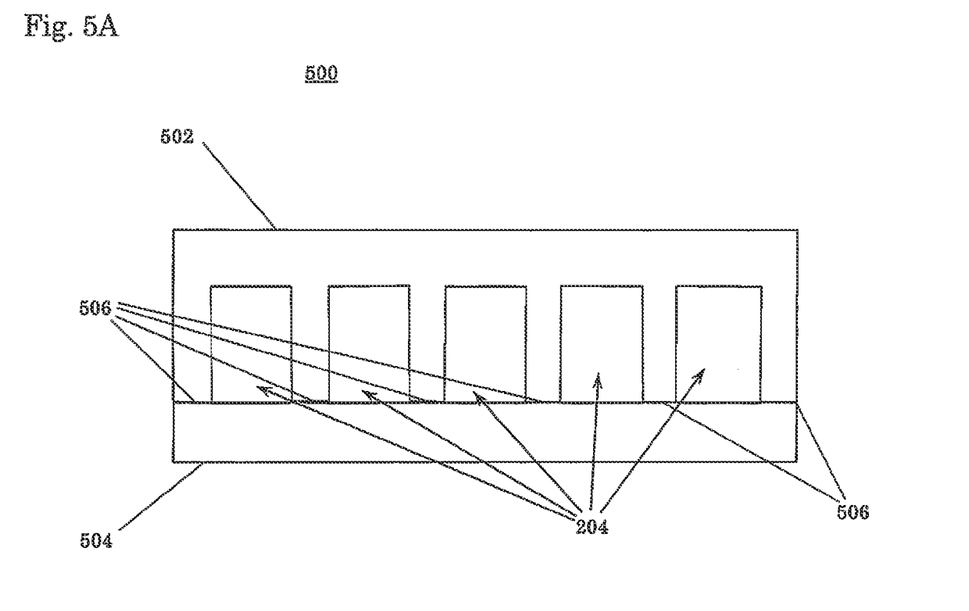
FIG. 5A is a side cut-away drawing of an alternative exemplary ion chamber based neutron detector according to the present invention.
Figure 5B:
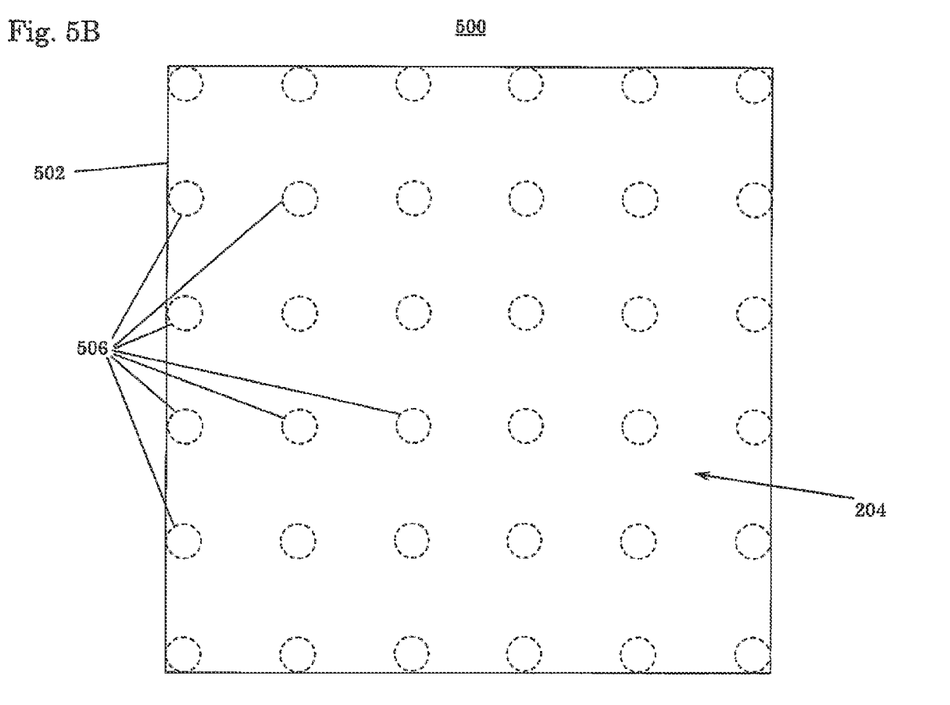
FIG. 5B is a top plan drawing of the alternative exemplary ion chamber based neutron detector of FIG. 5A.

The cross-section of high pressure ion chamber 202 parallel to the bottom electrode may be round as illustrated in FIG. 2B or it may be rectangular as illustrated in FIG. 3B. FIGS. 5A and 5B illustrate alternative ion chamber design 500 that may be employed. In this alternative design, ion chamber 500 is formed by bonding etched die portion 502 to flat die portion 504 at bond points 506. Etched die portion 502 is etched to include an array of columns. This alternative design may allow for an ion chamber with a larger cross-sectional area that is able to withstand extremely high pressures.

FIGS. 3A and 3B illustrate another exemplary embodiment of the present invention. Exemplary ion chamber based neutron detector 300 includes an ion chamber formed in a bonded semiconductor die and monolithically integrated readout circuitry 312. The bonded semiconductor die is formed by bonding etched semiconductor substrate 302 to active semiconductor substrate 304 at bond points 306. Bonded semiconductor die may desirable be formed silicon or silicon based materials. In one exemplary embodiment, etched semiconductor substrate 302 is formed of silicon and active semiconductor substrate 304 is a silicon on insulator (SOI) substrate.

Monolithic integration of the read out circuitry may desirably reduce the capacitance and, thus, noise associated with read out of the charge collected from the reaction particle ion trails of detected neutrons. Combined with increased charge collection (due to reduced recombination) and improved pulse shape resolution (due to reduce drift time) from a reduced distance 106 between electrode 308, 310, the use monolithically integrated readout circuitry 312 may allow for significantly improved signal to noise ratio and pulse rise time determination for exemplary ion chamber based neutron detector 300. Another advantage of the use of monolithically integrated readout circuitry 312 may be simplification of designing an exemplary pixelated ion chamber based neutron detector (not shown) using a two (or three) dimensional array of individual neutron detectors, such as exemplary ion chamber based neutron detector 300.

A hollow space which will form the volume of the ion chamber is etched into etched semiconductor substrate 302. Top electrode 308 is formed on the top surface of this hollow space. As noted above with reference to FIGS. 2A and 2B, reference to the top and bottom herein are used as illustrated in the side cut away drawing of FIG. 3A; and these references are merely for clarity and are not intended to be limiting.

Monolithically integrated readout circuitry 312 is formed in active semiconductor substrate 304. This circuitry may be formed using a CMOS or other standard semiconductor fabrication process; however, it may be desirable to use radiation hardened circuit designs and fabrication processes. For example, if active semiconductor substrate 304 is an SOI substrate, monolithically integrated readout circuitry 312 may be fabricated using an SOI radiation hardened fabrication process.

Bottom electrode 310 is formed on the opposite surface of active semiconductor substrate 304, which is desirably parallel to the top surface of the hollow space of etched semiconductor substrate 302 after bonding. Although bottom electrode 310 may be electrically coupled to monolithically integrated readout circuitry 312 later, it may be desirable to electrically couple these elements during the fabrication process. Monolithically integrated readout circuitry 312 is also electrically coupled to top electrode 308.

Fabrication of monolithically integrated readout circuitry 312 and bottom electrode 310 may desirable be performed before etched semiconductor substrate 302 is bonded to active semiconductor substrate 304; or alternatively, fabrication of monolithically integrated readout circuitry 312 and bottom electrode 310 may occur after the bonded semiconductor die has been formed.

Monolithically integrated readout circuitry 312 may desirably include low noise preamplifier circuitry and shaper amplifier circuitry to provide a time varying output signal proportional to the charge collected by electrodes 308, 310.

Figure 4:
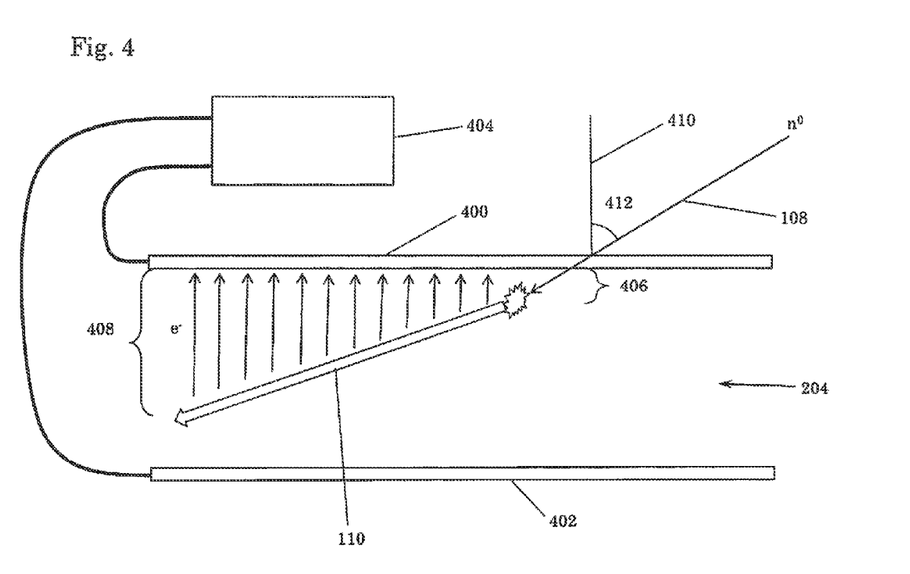
FIG. 4 is a schematic drawing of an exemplary directional neutron detector according to the present invention.

FIG. 4 illustrates schematically an exemplary directional neutron detector design according to the present invention. The features of this exemplary directional neutron detector design may be implemented with any of the exemplary ion chamber based neutron detectors disclosed above with reference to FIGS. 2A, 2B, 3A, 3B, 5A, and 5B.

A neutron following path 108 collides with an atom of neutron absorbing material 204 creating reaction particle ion trail 110. An electric field between top electrode 400 and bottom electrode 402 causes oppositely charged particle to accelerate toward the opposite electrodes. In the exemplary schematic drawing of FIG. 4, electrons are accelerated toward top electrode 400 and positively charged ions (not shown) are accelerated toward bottom electrode 402. The illustrated polarity in which the neutron enters the ion chamber through a positively charged top electrode 400 (i.e. the signal electrode) may have the advantage of a somewhat shorter average drift distances for electrons which may lead to improved charge collection. (The much slower moving ions may often recombine with electrons emitted from bottom, or ground, electrode 402 rather than drifting all of the way to this electrode. Therefore, charge collection is dominated by electron collection at top, or signal, electrode 400.)

Charges, electrons and ions, are formed all along reaction particle ion trail 110. Electrons at the beginning of reaction particle ion trail 110 have a shorter distance 406 to drift before collection and those at the end of reaction particle ion trail 110 have a longer distance 408 to drift before collection. A longer distance means a longer time between formation and collection of these charges. Thus, the rise time of the pulse of electrons reaching top electrode 400 is dependent on the length and angle of reaction particle ion trail 110 within the ion chamber. The length of reaction particle ion trail 110 is dependent on a number of factors including: the composition and pressure of neutron absorbing material 204; the energy of the detected neutron; and whether trail is truncated by one of the sides of the ion chamber. The composition and pressure of neutron absorbing material 204 may be predetermined. The energy of the neutron may be determined from the total charge collected (assuming minimal recombination) and knowledge of the composition and pressure of neutron absorbing material 204. And the ion chamber size may be chosen to reduce the probability that the reaction particle ion trail 110 is truncated by a side of the ion chamber. Desirably, a minimum width of a cross section of the ion chamber parallel to electrodes 400 and 402 is several orders of magnitude larger than the reaction particle ion trail length for neutrons absorbed by neutron absorbing material 204 at the chamber pressure. Therefore, for arbitrary incident angles with the ion chamber only the top and bottom sides have any significant probability of truncating a reaction particle ion trail. If the distance between top electrode 400 and bottom electrode 402 is greater than the typical reaction particle ion trail length for neutrons absorbed by neutron absorbing material 204 at the chamber pressure the effect of truncation on the top and bottom sides of the ion chamber may be desirably low.

Thus, the length of reaction particle ion trail 110 as a function of neutron energy may be determined based on predetermined factors with relatively high certainty. Once the length of the reaction particle ion trail 110 is determined, the angle of reaction particle ion trail relative to normal 410 of top electrode 400. As illustrated in FIG. 4, reaction particle ion trail 110 is approximately collinear to neutron path 108 for a given detected neutron. Therefore, path angle 412 of neutron path 108 relative to normal 410 to top electrode 400 may be calculated from the pulse shape of the collected charge for reaction particle ion trail 110.

Electrodes 400 and 402 are electrically coupled to processor circuitry 404. Processor circuitry 404 may desirably include readout circuitry and a signal processor. The read out circuitry electrically coupled to signal electrode 400 and ground electrode 402, and adapted to generate a time varying signal proportional to charge (i.e. electrons) collected by signal electrode 400 as a function of time. Desirably, the read out circuitry may be monolithically integrated into the ion chamber as illustrated in FIGS. 3A and 3B.

The time varying signal generated by the read out circuitry, which desirably includes a pulse corresponding to each neutron absorbed by neutron absorbing material 204, is electrically coupled to the signal processor. The signal processor is adapted to determine path angle 412 of neutron path 108 relative to normal 410 to top electrode 400 (i.e. the top surface of the ion chamber) for each absorbed neutron, based on the rise time of the corresponding pulse in the time varying signal.

Determining path angle 412 relative to normal 410 to top electrode 400, places neutron path 108 as lying in a cone. This is an improvement over the lack of directional information available with most neutron detectors, but it does not provide complete information regarding the neutron source. For stationary neutron sources, the exemplary directional neutron detector of FIG. 4 may be adequate. Multiple measurements with the detector oriented in different directions may allow the precise direction of the neutron paths to be determined. For moving neutron sources, however, this method is likely inadequate. To quickly determine the direction to the neutron source an exemplary detector system incorporating two or three orthogonally oriented exemplary directional neutron detectors (as illustrated in FIG. 4). Assuming that there is a single strong neutron source, the vast majority of the detected neutrons should be traveling in approximately the same direction. Thus, although each neutron is detected by only one detector, by identifying the overlap of the directional cones about their respective normal determined by each of the individual exemplary directional neutron detectors, the exact direction to the neutron source may be determined with significant accuracy by using such an exemplary detector system.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A neutron detector with monolithically integrated readout circuitry, comprising:
   a bonded semiconductor die including an etched substrate bonded to an active semiconductor substrate;
   an ion chamber formed in the etched substrate, the ion chamber having a pair of parallel, substantially planar surfaces;
   a first electrode formed on one said surface;
   a second electrode formed on the other said surface at an interelectrode separation distance from the first electrode;
   a material, filling the ion chamber, that reacts with neutrons to create ion trails; and
   readout circuitry formed in a portion of the active semiconductor substrate and electrically coupled to the first and second electrodes;
   wherein the interelectrode separation distance is no more than half an attenuation length for thermal neutrons in the ion-trail-creating material filling the ion chamber at a pressure of 100 atm at room temperature.

2. The neutron detector of claim 1, wherein a cross-section of the ion chamber taken parallel to the first electrode is rectangular or round.

3. The neutron detector of claim 2, wherein said cross section has an area at least one hundred times the square of the interelectrode separation distance.

4. The neutron detector of claim 1, wherein ion-trail-creating material includes at least one substance selected from the group consisting of: helium-3, helium-4, xenon, hydrogen, propane, and methane.

5. The neutron detector of claim 1, wherein a chamber pressure of ion-trail-creating material filling the ion chamber is at least 100 atm.

6. The neutron detector of claim 5, wherein, in operation, the ion-trail-creating material is a liquefied gas.

7. The neutron detector of claim 1, wherein the bonded semiconductor die is a bonded silicon die.

8. The neutron detector of claim 1, wherein:
   the active semiconductor substrate of the bonded semiconductor die is a silicon on insulator (SOI) substrate; and
   the readout circuitry includes radiation hardened electronics formed using an SOI radiation hardened process.

9. The neutron detector of claim 1, wherein the readout circuitry includes low noise preamplifier circuitry and shaper amplifier circuitry.

* * * * *